United States Patent [19]

Kamens

[11] Patent Number: 5,493,543
[45] Date of Patent: Feb. 20, 1996

[54] CAPACITIVE CHARGE PUMP DRIVER CIRCUIT FOR PIEZOELECTRIC ALARM

[75] Inventor: Bruce H. Kamens, Thomaston, Conn.

[73] Assignee: Timex Corporation, Middlebury, Conn.

[21] Appl. No.: 334,983

[22] Filed: Nov. 7, 1994

[51] Int. Cl.[6] ................................................. H02M 3/18
[52] U.S. Cl. ............................ 368/255; 307/110; 363/60
[58] Field of Search ............................. 363/60; 307/110; 368/250–270

[56] References Cited

U.S. PATENT DOCUMENTS

| | | |
|---|---|---|
| 3,863,436 | 2/1975 | Schwarzschild et al. . |
| 4,068,461 | 1/1978 | Fassett et al. . |
| 4,636,930 | 1/1987 | Bingham et al. . |
| 4,807,104 | 2/1989 | Floyd et al. . |
| 4,839,787 | 6/1989 | Kojima et al. . |
| 4,888,677 | 12/1989 | Grimm et al. . |
| 4,979,088 | 12/1990 | Misaki et al. . |
| 5,008,799 | 4/1991 | Montalvo . |
| 5,237,209 | 8/1993 | Brewer ........................................ 363/60 |
| 5,262,934 | 11/1993 | Price ............................................ 363/60 |
| 5,397,928 | 3/1995 | Chan et al. ................................ 363/60 |

*Primary Examiner*—Bernard Roskoski
*Attorney, Agent, or Firm*—William C. Crutcher; David H. Hwang

[57] ABSTRACT

A capacitive charge pump circuit and associated method is provided for outputting an output voltage which has a magnitude which is an integer multiple of the magnitude of a power supply voltage used to power the circuit. In one form, a capacitor is charged to the power supply voltage, $V_s$. The capacitor is alternately coupled to the power supply voltage and ground so that in an alternating manner, $2 V_s$ and $-V_s$ appear across it. By coupling a first electrode of a piezoelectric crystal to the capacitor and a second electrode of the piezoelectric crystal to the power supply voltage, a signal having a peak-to-peak magnitude which is three times that of the power supply voltage will drive the piezoelectric crystal.

11 Claims, 5 Drawing Sheets

CAPACITIVE CHARGE PUMP DRIVER CIRCUIT FOR PIEZOELECTRIC ALARM

This invention relates generally to an improved driver circuit and associated method for timepiece alarms, More specifically, this invention relates to a capacitive charge pump circuit and associated method for driving piezoelectric alarms in electronic timepieces.

BACKGROUND OF THE INVENTION

Electronic timepiece alarms are known which include a driving circuit for providing signals of constantly reversing polarity to a piezoelectric crystal, thus causing the crystal to oscillate and produce an audible sound. It is also known that such piezoelectric alarms require a higher voltage for operation than is normally available from the timepiece energy cell itself. As a result, several circuit configurations have been devised to provide the higher voltage needed to drive the piezoelectric alarm.

One such configuration comprises the connection of the piezoelectric alarm to CMOS switches in an H-bridge circuit, a variation of which is disclosed in U.S. Pat. No. 4,068,461 "Digital Electronic Alarm Watch" (Fassett et al.) and shown in FIG. 1. A first inverter 93 includes a pair of MOS transistors 113 and 115, the gate electrodes 117 and 119 of these devices being connected to an input conductor 85 which carries a square wave signal varying from 0 to $+V_s$, the supply voltage. The MOS transistor 113 is a P-channel device while the transistor 115 is an N-channel device, the source 121 of the transistor 113 and the drain 123 of the transistor 115 being connected to a front electrode 63 of a piezoelectric crystal 61. The drain 125 of the transistor 113 is connected to $+V_s$. The source terminal 129 of the transistor 115 is connected to ground.

Figure 1:
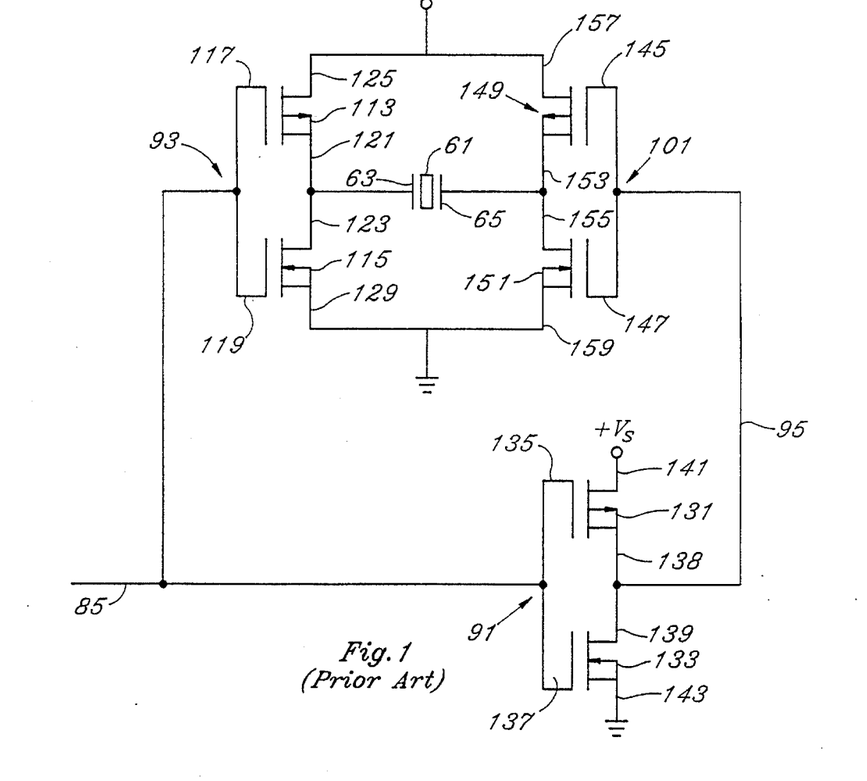
FIG. 1 illustrates in schematic form a known driving circuit for a piezoelectric crystal.

In a similar manner, a second inverter 91 includes a P-channel MOS transistor 131 and an N-channel MOS transistor 133, the gates 135 and 137 of these devices being connected in parallel to the input conductor 85. The source terminal 138 and drain terminal 139 of the transistors 131 and 133, respectively, are connected to an output line 95 of the second inverter 91. The source terminal 143 of the transistor 133 is connected to ground. The drain terminal 141 of the transistor 131 is attached to $+V_s$.

The output line 95 from the second inverter 91 drives the gate terminals 145 and 147 of a P-channel MOS transistor 149 and an N-channel MOS transistor 151, respectively, of a third inverter 101. The source terminal 163 of the transistor 149 and the drain terminal 155 of the transistor 151 are connected to a second electrode 65 of the piezoelectric crystal 61. The drain terminal 157 of the transistor 149 is connected to $+V_s$, while the source terminal 159 of the transistor 151 is connected to ground.

The prior art of FIG. 1 operates as follows. When the square wave varying between 0 and $+V_s$ volts on input line 85 is at $+V_s$, the MOS transistors 113, 151 and 131 are nonconductive while the MOS transistors 115, 149 and 133 are conductive. The output line 95 from the second inverter 91 is thus clamped to ground. The output of the first inverter 93 on the front electrode 63 is likewise clamped to ground, while the output of the third inverter 101 on the second electrode 65 is maintained at $+V_s$. In the remaining half cycle of the square wave input, when the input line 85 is clamped to ground, the MOS transistors 113, 151 and 131 are conductive while the transistors 115, 149 and 133 are nonconductive. The output line 95 from the second inverter 91 is clamped to $+V_s$, as is the output of the first inverter 93 on the front electrode 63, while the output of the third inverter 101 on the second electrode 65 is at ground. Therefore, the polarity across the piezoelectric crystal 61 is reversed from the first half cycle of the square wave input, and the resulting peak-to-peak voltage across the crystal 61 is virtually doubled to $+2\,V_s$.

Figure 2:
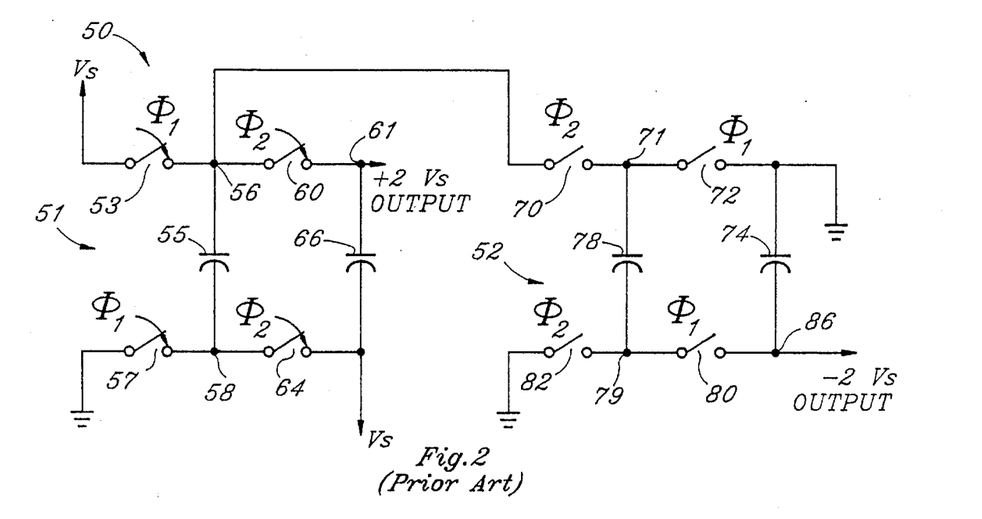
FIG. 2 illustrates in schematic form a known charge pump circuit.

Another configuration is a voltage multiplying and inverting charge pump circuit shown in U.S. Pat. No. 4,807,104, issued on Feb. 21, 1989 and assigned to Motorola, Inc. This circuit 50 is illustrated in FIG. 2, and generally comprises a positive voltage portion 51 and a negative voltage portion 52. Positive voltage portion 51 comprises a switch 53 having a first terminal connected to a positive portion supply voltage terminal for receiving a positive power supply voltage, $+V_s$. A second terminal of switch 53 is connected to a first electrode of a transfer capacitor 55 at a node 56. A second electrode of capacitor 55 is connected to a first terminal of a switch 57 at a node 58. A second terminal of switch 57 is connected to a ground reference terminal. A first terminal of a switch 60 is connected to the second terminal of switch 53 at a node 56. A second terminal of switch 60 provides a positive doubled output voltage, $+2\,V_s$, at a node 61. A switch 64 has a first terminal connected to node 58 and a second terminal connected to power supply voltage $+V_s$. A first electrode of a reservoir capacitor 66 is connected to the second terminal of switch 60 at node 61, and a second electrode of capacitor 66 is connected to the power supply voltage for receiving $+V_s$.

Negative voltage portion 52 comprises a switch 70 having a first terminal connected to node 56 and a second terminal connected to a node 71. A first terminal of a switch 72 is connected to the second terminal of switch 70. A second terminal of switch 72 is connected to the ground reference terminal. A first electrode of a reservoir capacitor 74 is connected to the second terminal of switch 72. A first electrode of a transfer capacitor 78 is connected to node 71, and a second electrode of transfer capacitor 78 is connected at a node 79 to a first terminal of a switch 80 and to a first terminal of a switch 82. A second terminal of switch 82 is connected to a ground reference terminal. A second terminal of switch 80 is connected to a second electrode of reservoir capacitor 74 at a node 86 which provides a negative doubled output voltage, $(-2\,V_s)$. Each of switches 53, 57, 60, 64, 70, 72, 80 and 82 has a control electrode. The control electrode of switches 53, 57, 72 and 80 is coupled to a control signal $\Phi_1$, and the control electrode of switches 60, 64, 70 and 82 is coupled to a control signal $\Phi_2$. Control signals $\Phi_1$ and $\Phi_2$ are nonoverlapping clock signals.

In operation, charge pump 50 has first and second periods of operation as defined by the logic states of control signals $\Phi_1$ and $\Phi_2$. During a first period of circuit operation, control signal $\Phi_1$ has a high logic state and control signal $\Phi_2$ has a low logic state. During the first period of circuit operation, switches 53, 57, 72 and 80 are conductive and switches 60, 64, 70 and 82 are nonconductive. During a second period of circuit operation, control signal $\Phi_1$ has a low logic state and control signal $\Phi_2$ has a high logic state. During the second period of circuit operation, switches 53, 57, 72 and 80 are nonconductive, and switches 60, 64, 70 and 82 are conductive.

In the positive voltage portion 51 during the first period of circuit operation, capacitor 55 charges to a voltage equal to the supply voltage $V_s$ via switches 53 and 57. During the second period of circuit operation, transfer capacitor 55 is disconnected from between ground and $V_s$. The second electrode of transfer capacitor 55 is negatively charged and is connected to supply voltage $V_s$ by switch 64. As a result, the first electrode of transfer capacitor 55 which is positively charged is translated to a doubled transfer voltage of $(+2\ V_s)$. The doubled transfer voltage across transfer capacitor 55 is charge shared onto reservoir capacitor 66 via switches 60 and 64. Reservoir capacitor 66 is permanently connected between power supply voltage $V_s$ and the positive doubled output voltage, $(+2\ V_s)$ at node 61. The charge on reservoir capacitor 66 is added with the power supply voltage $V_s$ to provide a continuous positive output voltage equal to $(+2\ V_s)$ at node 61.

In the negative voltage portion 52, during the second period of circuit operation the transfer voltage, $(+2\ V_s)$ at node 56 is charge shared onto transfer capacitor 78 via switches 64, 70 and 82. Subsequent to the second period of circuit operation, transfer capacitor 78 is disconnected from the $(+2\ V_s)$ transfer voltage. The first electrode of transfer capacitor 78 at node 71 is positively charged with respect to ground and is connected to ground during a successive first period of circuit operation. The voltage across transfer capacitor 78 is translated and the negatively charged second electrode of transfer capacitor 78 is at a voltage potential of $(-2\ V_s)$. The $(-2\ V_s)$ voltage of transfer capacitor 78 is charge shared onto reservoir capacitor 74 via switches 72 and 80. Reservoir capacitor 74 is always connected between the ground reference and node 86 to provide a continuous negative output voltage of $(-2\ V_s)$.

Charge pump 50, as disclosed in the '104 patent, may be expanded to include other voltage doubling circuit portions for further doubling the power supply voltage from $2\ V_s$ to additional integer multiples of $V_s$. This requires utilization of additional components. If such a circuit extension is desired, duplicates of charge pump circuit 50 may be provided with the $2\ V_s$ transfer voltage of charge pump 50 used as the power supply voltage for the additional circuitry.

Although the operation of the aforementioned circuits have proven acceptable in certain timepiece applications, it is found that because of design limitations, aesthetic considerations, and overall timepiece economics, these circuit designs have several drawbacks. Specifically, as it is known that advances in increased integrated circuit density have been made in recent years, and that thinner wristwatches are perceived by the consumer to be more aesthetic, much effort has been made to decrease the size of a timepiece by reducing the number of electronic components within the timepiece and including as many components on the timepiece integrated circuit chip as possible.

The H-bridge configuration of FIG. 1 is disadvantageous because it requires that both terminals of the piezoelectric alarm be isolated from the timepiece energy cell, and also that the alarm be insulated from the timepiece caseback. As it is found that a more inexpensive and less complex construction of a piezoelectric alarm transducer circuit involves the connection of the piezoelectric alarm directly to the caseback and energy cell via conducting ink or epoxy, (thereby using the timepiece caseback or bezel to produce the audible sound), use of the H-bridge configuration would require that additional contacts be made from the piezoelectric alarm to the battery. This would unnecessarily add to both the expense and the complexity of the timepiece alarm during manufacture of the timepiece. Furthermore, utilizing an H-bridge circuit limits the output voltage to approximately twice the supply voltage. Consequently, the loudness of the alarm may be unsatisfactory.

The charge pump circuit of FIG. 2, while permitting higher output voltages than the H-bridge circuit, requires the use of many components, including the need for multiple capacitors. Thus, given the paramount importance of reducing the size of a timepiece, this circuit design is not optimal for driving a piezoelectric alarm.

Therefore, it is an object of the present invention to provide a high voltage output circuit and method for driving a piezoelectric alarm within a timepiece which minimizes the number of components and thus, the size of the timepiece itself.

It is another object of the present invention to minimize the number of components extraneous to the timepiece integrated circuit.

A further object of the present invention is to provide a simple and efficient means to boost voltage for driving a piezoelectric alarm without isolating the piezoelectric crystal from the battery or timepiece caseback.

SUMMARY OF THE INVENTION

Briefly stated, the circuit and method of the present invention concerns a capacitive charge pump circuit which comprises a first switching means coupled to a power supply source providing a first potential, a capacitive means coupled to the first switching means, the capacitive means being charged to substantially the first potential by operation of a first control signal coupled to the first switching means, a second switching means coupled to the capacitive means, the second switching means translating the potential across the capacitive means to a second potential, a third switching means coupled to the capacitive means, the third switching means translating the potential across the capacitive means to a third potential, a piezoelectric crystal having a first and a second electrode, the second electrode being coupled to a fourth potential, and means for alternately coupling the second switching means and the third switching means to the first electrode of the piezoelectric crystal so that the first electrode alternates between the second potential and the third potential.

BRIEF DESCRIPTION OF THE DRAWINGS

The subject matter, which is regarded as the invention, is particularly pointed out and distinctly claimed in the concluding portion of the specification. The invention, however, both as to organization and to method of practice, together with further objects and advantages thereof, may best be understood by reference to the following description, taken in connection with the accompanying drawings, in which:

DETAILED DESCRIPTION OF THE PREFERRED EMBODIMENT

Figure 3:
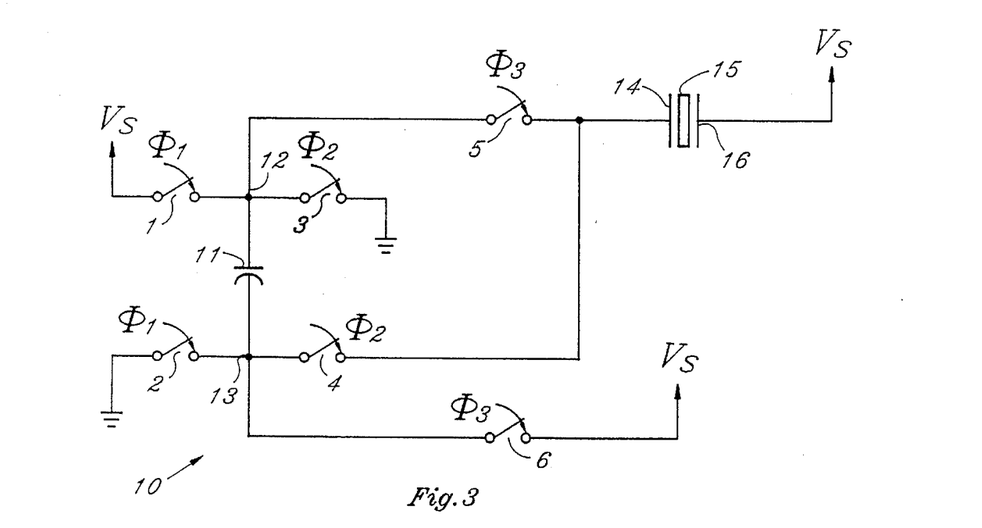
FIG. 3 illustrates in schematic form a capacitive charge pump circuit in accordance with the present invention.

FIG. 3 shows, in schematic form, the preferred embodiment of the capacitive charge pump circuit 10 of the present invention. A switch 1 has a first terminal connected to a supply voltage terminal for receiving a power supply voltage, $V_s$. A second terminal of switch 1 is connected to a first electrode of a capacitor 11 at a node 12. A second electrode of capacitor 11 is connected to a second terminal of switch 2 at a node 13. A first terminal of switch 2 is connected to a ground reference terminal. A first terminal of a switch 3 is connected to the second terminal of switch 1 at node 12. A second terminal of switch 3 is connected to the ground reference terminal. A switch 4 has a first terminal connected to node 13 and a second terminal connected to a first electrode 14 of a piezoelectric crystal 15. A second electrode 16 of the piezoelectric crystal 15 is connected to the power supply voltage for receiving $V_s$. A first terminal of a switch 5 is connected to node 12 and a second terminal of switch 5 is connected to the first electrode 14 of the piezoelectric crystal 15. A switch 6 has a first terminal connected to node 13 and a second terminal connected to the power supply voltage for receiving $V_s$.

Each of the aforementioned switches has a control terminal. The control terminals of switches 1 and 2, these two switches comprising a first switching means, are coupled to a control signal $\Phi_1$. The control terminals of switches 3 and 4, these two switches comprising a second switching means, are coupled to a control signal $\Phi_2$. The control terminals of switches 5 and 6, these two switches comprising a third switching means, are coupled to a control signal $\Phi_3$. In the preferred embodiment, $\Phi_1$ is a 32 kHz signal having a 50% duty cycle. The frequencies of signals $\Phi_2$ and $\Phi_3$ alternate between 2 kHz and 32 kHz, at a 180° phase difference. It will be understood that other frequencies may be used to operate $\Phi_1$, $\Phi_2$ and $\Phi_3$, the frequencies being limited only by parameters for linear operation.

Figure 4:
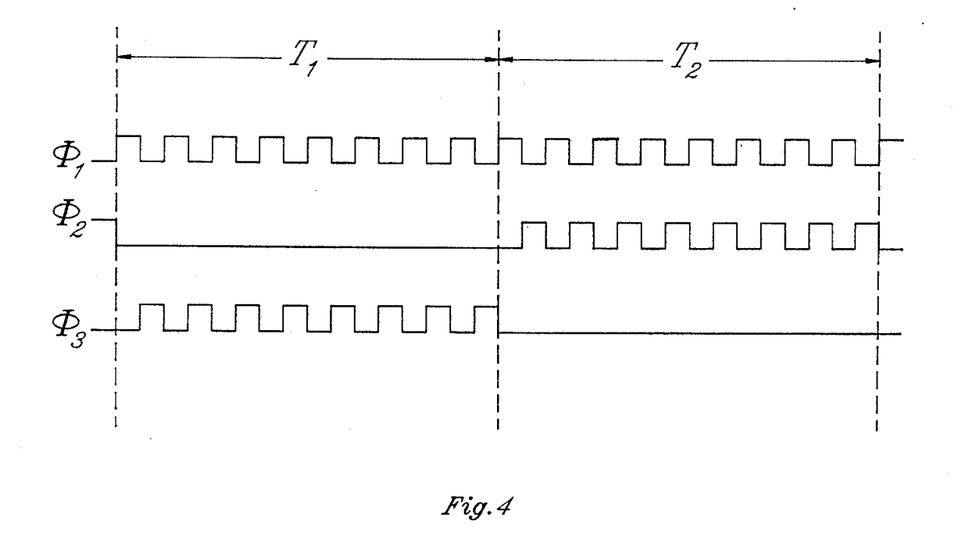
FIG. 4 illustrates in graphical form control signals associated with the circuit of FIG. 3.

The operation of the capacitive charge pump circuit 10 of FIG. 3 may be understood with reference to the control signal timing diagram shown in FIG. 4. The capacitive charge pump circuit 10 has first and second periods of operation. During the first period, represented as $T_1$, control signal $\Phi_2$ is at a logic low level while control signal $\Phi_1$ causes switches 1 and 2 to be alternately conductive and nonconductive in unison in a synchronous manner. At the same time, control signal $\Phi_3$ causes switches 5 and 6 to be alternately and synchronously conductive and nonconductive in unison. During the second period, represented as $T_2$, control signal $\Phi_3$ is at a logic low level while control signal $\Phi_1$ continues to cause switches 1 and 2 to be alternately conductive and nonconductive in unison in a synchronous manner. Control signal $\Phi_2$ now causes switches 3 and 4 to be alternately and synchronously conductive and nonconductive in unison. Note that control signals $\Phi_2$ and $\Phi_3$, as stated before, have a 180° phase difference.

During the first period of circuit operation, $\Phi_1$ causes the capacitor 11 to charge to a voltage equal to the supply voltage, $V_s$, via switches 1 and 2. $\Phi_3$ causes the negatively charged second electrode of the capacitor 11 to be connected to supply voltage $V_s$ by switch 6. As a result, the first electrode of the capacitor 11, which is positively charged, is translated to substantially a doubled supply voltage of 2 $V_s$. Therefore, a voltage substantially equal to 2 $V_s$ will appear at the first electrode 14 of the piezoelectric crystal 15 through switch 5.

During the second period of circuit operation, control signal $\Phi_1$ continues to cause the capacitor 11 to charge to a voltage equal to the supply voltage, $V_s$, via switches 1 and 2. $\Phi_2$ causes the positively charged first electrode of the capacitor 11 to be connected to ground. As a result, the voltage across the capacitor 11 is translated, and a voltage substantially equivalent to $-V_s$ will appear at the first electrode 14 of the piezoelectric crystal 15 through switch 4.

As illustrated in FIG. 3, the second electrode 16 of the piezoelectric crystal 15 is held at the supply voltage, $V_s$. Thus, at the end of the first period, $T_1$, during which a voltage substantially equal to 2 $V_s$ appears at the first electrode 14 of the piezoelectric crystal 15, the voltage across the piezoelectric crystal 15 is substantially $V_s$ in one polar direction. At the second period, $T_2$, during which a voltage substantially equivalent to $-V_s$ appears at the first electrode 14 of the piezoelectric crystal 15, the voltage across the piezoelectric crystal 15 is substantially 2 $V_s$ in a polar direction opposite to that from the first period. It is therefore apparent that the operation of the capacitive charge pump circuit 10 of FIG. 3 serves to drive the piezoelectric crystal 15 by a periodic signal having a peak-to-peak magnitude which is substantially three times that of the power supply voltage, $V_s$.

A breadboard of the capacitive charge pump circuit 10 was successfully operated using a capacitor of 0.1 µf and frequencies of $\Phi_1$=32 kHz and $\Phi_2$ and $\Phi_3$=2 kHz and 32 kHz, alternately. It will be understood that the greater the switching frequencies over the capacitor 11, the smaller its capacitance must be.

Figure 5:
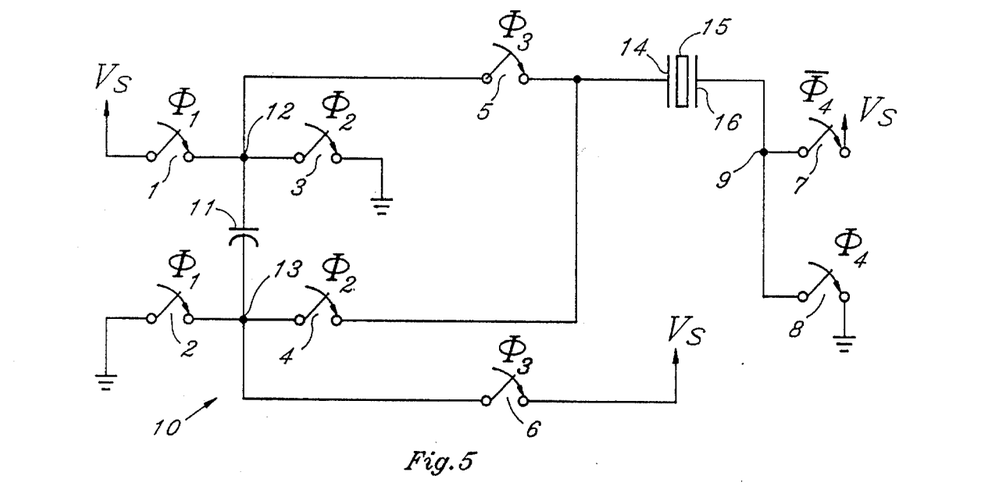
FIG. 5 illustrates in schematic form a second embodiment of the capacitive charge pump circuit of the present invention.

In another form, the capacitive charge pump circuit 10 may be expanded, as shown in FIG. 5, to increase the peak-to-peak voltage appearing across the piezoelectric crystal 15 to substantially four times the magnitude of the power supply voltage. A switch 7 has a first terminal connected to the second electrode 16 of the piezoelectric crystal 15 at a node 9. A second terminal of switch 7 is connected to the power supply voltage for receiving $V_s$. A first terminal of a switch 8 is connected to node 9, and a second terminal of switch 8 is connected to the ground reference terminal. Switches 7 and 8 have control terminals coupled to a control signal $\Phi_4$. However, the control terminal of switch 7 is inversely coupled so that when $\Phi_4$ is at a logic high level, switch 7 is nonconductive, and vice-versa. Note that the rest of the circuit is the same as in FIG. 3.

Figure 6:
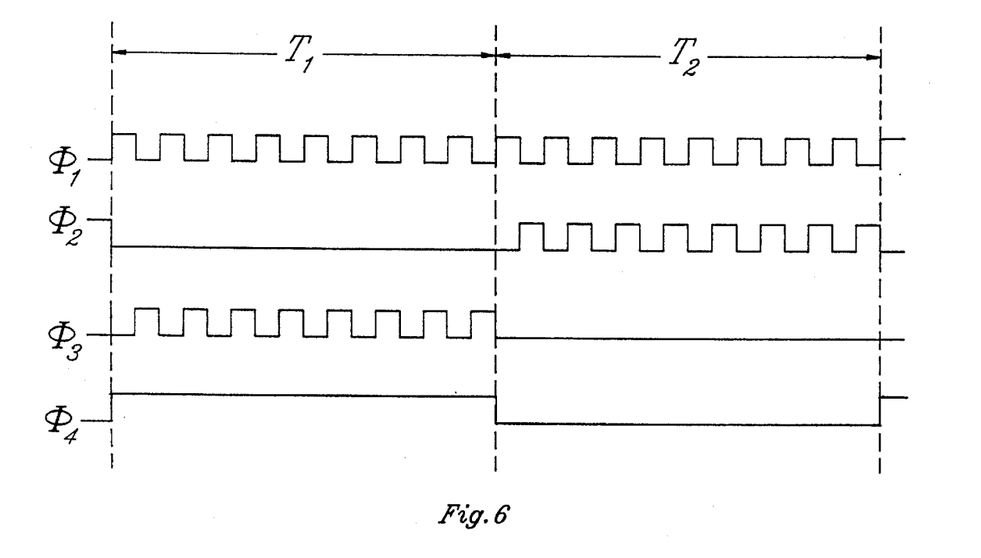
FIG. 6 illustrates in graphical form control signals associated with the circuit of FIG. 5.

The operation of the capacitive charge pump circuit 10 of FIG. 5 may be understood with reference to the control signal timing diagram shown in FIG. 6. The only difference between FIGS. 4 and 6 is the presence of control signal $\Phi_4$ in FIG. 6. As illustrated therein, during the first period, represented as $T_1$, control signal $\Phi_4$ is at a logic high level. This causes switch 8 to be conductive and switch 7 to be nonconductive. Thus, the second electrode 16 of the piezoelectric crystal 15 is at the ground reference terminal. Since a voltage substantially equal to 2 $V_s$ appears at the first electrode 14 of the piezoelectric crystal 15 during $T_1$, the voltage across the piezoelectric crystal 15 is substantially 2 $V_s$ in one polar direction. During the second period of circuit operation, control signal $\Phi_4$ is at a logic low level, causing switch 7 to be conductive and switch 8 to be nonconductive. The power supply voltage, $V_s$, therefore appears at the second electrode 16 of crystal 15 while a voltage substantially equivalent to $-V_s$ appears at the first electrode 14 of the crystal 15. This means that the voltage appearing across the piezoelectric crystal 15 is substantially 2 $V_s$ in a polar direction opposite to that from the first period. It is therefore apparent that the operation of the capacitive charge pump circuit 10 of FIG. 5 serves to drive the piezoelectric crystal 15 by a periodic signal having a peak-to-peak magnitude which is substantially four times that of the power supply voltage, $V_s$.

Figure 7:
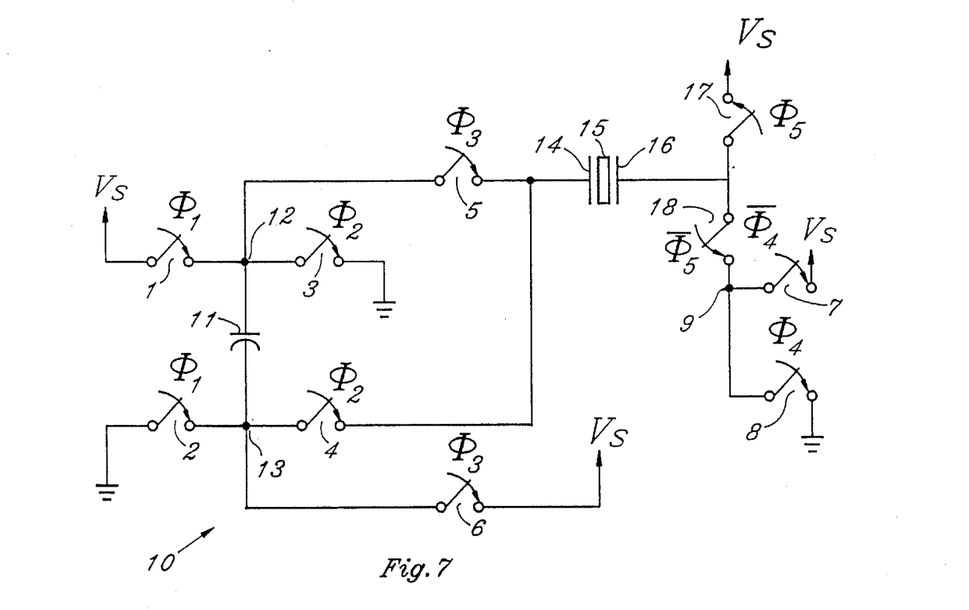
FIG. 7 illustrates in schematic form an embodiment of the capacitive charge pump circuit which incorporates the circuits in FIGS. 3 and 5.

FIG. 7 is an embodiment of the capacitive charge pump circuit 10 which incorporates the embodiments of the circuit 10 shown in FIGS. 3 and 5 into one circuit via a first mode select switch 17 and a second mode select switch 18. The first mode select switch 17 has a first terminal connected to the power supply voltage and a second terminal connected to the second electrode 16 of the piezoelectric crystal 15. The second mode select switch 18 has a first terminal connected to the second electrode 16 of the piezoelectric crystal 15 and a second terminal connected to node 9. Each mode select switch 17, 18 has a control terminal coupled to a control signal $\Phi_5$. Note that either switch 17 or switch 18 is inversely coupled to control signal $\Phi_5$. For purposes of illustration, switch 18 is inversely coupled to $\Phi_5$ in FIG. 7. By manipulating the control signal $\Phi_5$, the capacitive charge pump circuit 10 of FIG. 7 can be directed to produce a periodic signal having a peak-to-peak magnitude which is either three times or four times that of the power supply voltage.

Figure 8:
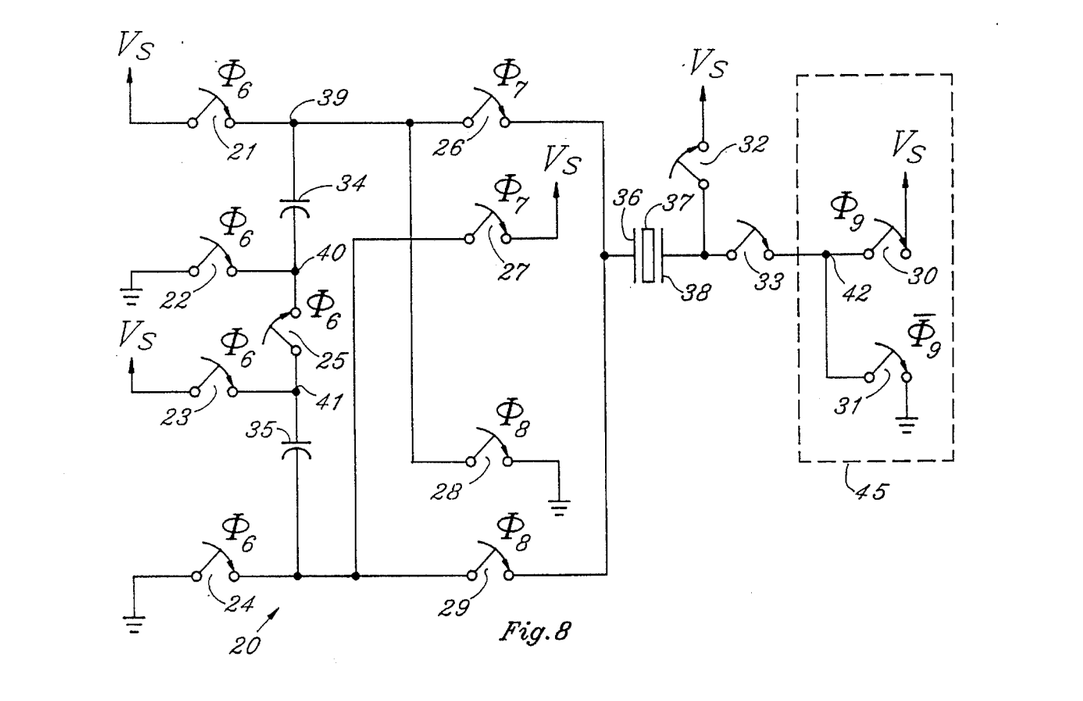
FIG. 8 illustrates in schematic form another embodiment of the capacitive charge pump circuit of the present invention.

This concept may be expanded to further increase the peak-to-peak voltage for driving a piezoelectric crystal to substantially 5 $V_s$ or 6 $V_s$ by adding an additional capacitor and configuring the circuit 20 as shown in FIG. 8. A switch 21 has a first terminal connected to a supply voltage terminal for receiving a power supply voltage, $V_s$. A second terminal of switch 21 is connected to a first electrode of a first capacitor 34 at a node 39. A switch 22 has a first terminal connected to a ground reference terminal and a second terminal connected to a second electrode of the first capacitor 34 at a node 40. A first terminal of a switch 23 is connected to the power supply voltage and a second terminal of switch 23 is connected to a first electrode of a second capacitor 36 at a node 41. A switch 24 has a first terminal connected to the ground reference terminal and a second terminal connected to a second electrode of the second capacitor 35. A switch 25 has a first terminal connected to node 40 and a second terminal connected to node 41. A first terminal of a switch 26 is connected to node 39 and a second terminal of switch 26 is connected to a first electrode 36 of a piezoelectric crystal 37. A switch 27 has a first terminal connected to the second terminal of switch 24 and a second terminal connected to the power supply voltage, $V_s$. A switch 28 has a first terminal connected to the first terminal of switch 26 and a second terminal connected to the ground reference terminal. A first terminal of a switch 29 is connected to the first terminal of switch 27 and a second terminal of switch 29 is connected to the first electrode 36 of the piezoelectric crystal 37.

A first terminal of a first mode select switch 32 is connected to the supply voltage, $V_s$. A second terminal of the first mode select switch 32 is connected to a second electrode 38 of the piezoelectric crystal 37. A second mode select switch 33 has a first terminal connected to the second electrode 38 of the piezoelectric crystal 37 and a second terminal connected to a node 42. A switch 30 has a first terminal connected to node 42 and a second terminal connected to the power supply voltage, $V_s$. A switch 31 has a first terminal connected to node 42 and a second terminal connected to the ground reference terminal.

All the switches 21, 22, 23, 24, 25, 26, 27, 28, 29, 30, 31, 32 and 33 have control terminals. The control terminals of switches 21, 22, 23, 24 and 25 are coupled to a control signal $\Phi_6$, the control terminals of switches 26 and 27 are coupled to a control signal $\Phi_7$, the control terminals of switches 28 and 29 are coupled to a control signal $\Phi_8$ and the control terminals of switches 30 and 31 are coupled to a control signal $\Phi_9$. Note that the control terminal of switch 31 is inversely coupled so that when $\Phi_9$ is at a logic high level, switch 31 is nonconductive, and vice-versa. As for the control terminals of the first mode select switch 32 and the second mode select switch 33, these are coupled to a control signal which can be manipulated, as in FIG. 7, to direct the capacitive charge pump circuit 20 to produce a periodic signal having a peak-to-peak magnitude which is either five times or six times that of the power supply voltage.

Figure 9:
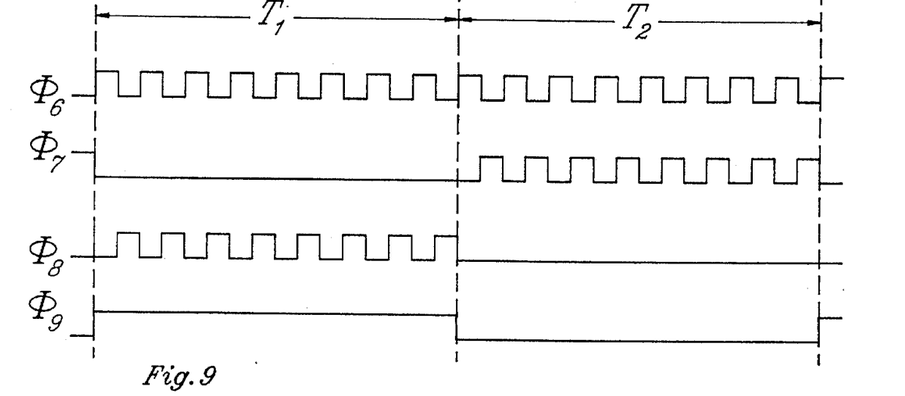
FIG. 9 illustrates in graphical form control signals associated with the circuit of FIG. 8.

The operation of the circuit 20 in FIG. 8 is similar to that of the foregoing embodiments and can be understood with respect to the control signal timing diagram shown in FIG. 9. The capacitive charge pump circuit 20 operates repetitively in two time periods, $T_1$ and $T_2$. Control signal $\Phi_6$ causes switches 21, 22, 23, 24 and 25 to be alternately conducting and nonconducting throughout both time periods. Control signals $\Phi_7$ and $\Phi_8$ cause switches 26, 27 and 28, 29, respectively, to be alternately conducting and non-conducting for one time period, but at a 180° phase difference. As in FIG. 7, the second electrode 38 of the piezoelectric crystal 37 is connected to either the power supply voltage $V_s$ if the first mode select switch 32 is conductive, or that portion of the circuit of FIG. 9 which is enclosed in dashed lines 45 if the second mode select switch 33 is conductive. The first mode select switch 32 will be conductive if 5 $V_s$ is desired, and the second mode select switch 33 will be conductive if 6 $V_s$ is desired.

To better explain the operation of the capacitive charge pump circuit 20 of FIG. 8, the circuit 20 will be described when 6 $V_s$ output voltage (i.e., switch 33 is conductive) is desired. During the first period of circuit operation, $T_1$, the first capacitor 34 and the second capacitor 35 each charges to a voltage equal to the supply voltage $V_s$. By operation of switch 25, the first electrode of the first capacitor 34 is at 2 $V_s$. This first electrode of the first capacitor 34 is positively charged and is connected to the ground reference terminal by switch 28. As a result, the first electrode of the first capacitor 34 is translated and a voltage substantially equal to $-2 V_s$ appears at the first electrode 36 of the piezoelectric crystal 37 via switch 29.

During the second period of circuit operation, $T_2$, the 2 $V_s$ appearing at the first electrode of the first capacitor 34 is increased to substantially 3 $V_s$ by the connection of the second electrode of the second capacitor 35, which is negatively charged, to the power supply voltage $V_s$ via switch 27. Thus, a voltage substantially equivalent to 3 $V_s$ appears at the first electrode 36 of the piezoelectric crystal 37 through switch 26.

During the first period, $V_s$ appears at the second electrode 38 of the piezoelectric crystal 37 since switch 30 is conductive and switch 31 is nonconductive. This means that the voltage across the crystal 37 at $T_1$ is substantially 3 $V_s$ in one polar direction. In the second time period, the second electrode 38 of the crystal 37 is at the ground reference terminal, and the voltage across the crystal 37 is substantially 3 $V_s$ in a polar direction opposite to that from $T_1$. Therefore, the magnitude of the peak-to-peak voltage appearing across the crystal 37 is substantially six times that of the power supply voltage, $V_s$.

Figure 10:
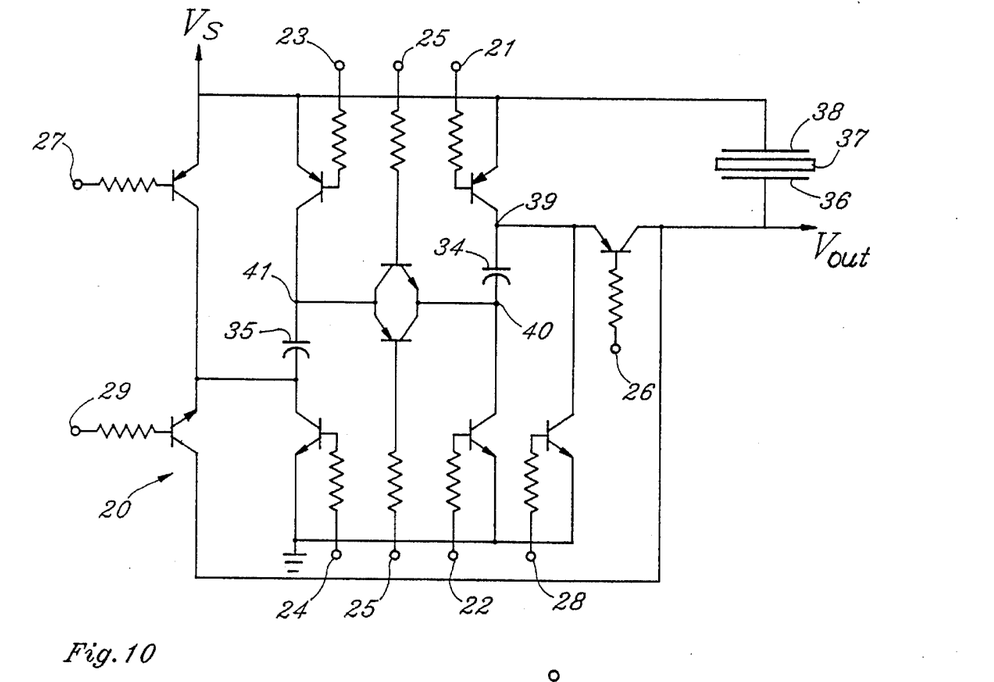
FIG. 10 is a detailed schematic of the circuit of FIG. 8, wherein the switches comprise resistor-biased bipolar transistors.

FIG. 10 shows the circuit of FIG. 8 when switches 21, 22, 23, 24, 25, 26, 27, 28 and 29 are resistor-biased bipolar transistors and the magnitude of the peak-to-peak output voltage across the piezoelectric crystal 37 is five times the power supply voltage. Note that any type semiconductor or optical switch of suitable switching speed may be used.

Figure 11:
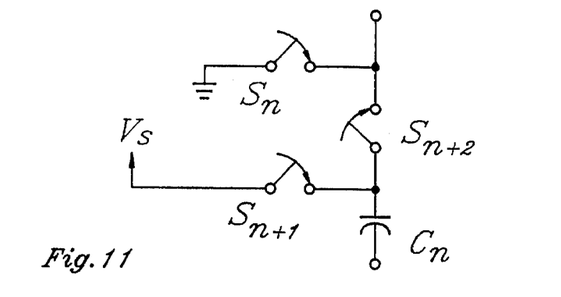
FIG. 11 is a schematic of a subcircuit, n of which may be connected to the circuit shown in FIG. 8 to provide an output voltage equivalent to the input voltage multiplied by (2n+5) or (2n+6).

Referring to FIG. 11, it will be understood that the addition of n subcircuits comprising three switches $S_n$, $S_{n+1}$, and $S_{n+2}$ and one capacitor $C_n$ connected between the second electrode of the second capacitor 35 and the second terminal of switch 24 in FIG. 8 will provide a waveform having a peak-to-peak voltage of substantially $(2n+5)V_s$ or $(2n+6)V_s$ for driving the piezoelectric crystal 37. The number of such n subcircuits is limited only by leakage problems, linear operation concerns and space considerations.

In the preferred embodiment, all components of the circuit of the present invention are placed on an integrated circuit chip. Note, however, that the capacitor may need to be placed off the chip, depending upon economics and various technical considerations of the timepiece.

While there has been described what is considered to be the preferred and alternate embodiments of the invention, other modifications will occur to those skilled in the art, and it is desired to secure in the appended claims all such modifications as fall within the true spirit and scope of the invention.

I claim:

1. A capacitive charge pump circuit which provides to a piezoelectric crystal a voltage having a peak-to-peak magnitude which is at least substantially three times a first potential provided by a power supply source, comprising:

a first switching means coupled to the power supply source, the power supply source having a power supply terminal and a ground reference terminal;

a single capacitor coupled to the first switching means, the capacitor being charged to substantially the first potential by operation of a first control signal coupled to the first switching means;

a second switching means coupled to the capacitor and the ground reference terminal, the second switching means translating the potential across the capacitor to a second potential;

a third switching means coupled to the capacitor and the power supply terminal, the third switching means translating the potential across the capacitor to a third potential;

the piezoelectric crystal having a first and a second electrode, the second electrode being coupled to a fourth potential; and means for alternately coupling the second switching means and the third switching means to the first electrode of the piezoelectric crystal so that the first electrode alternates between the second potential and the third potential.

2. The capacitive charge pump circuit of claim 1, wherein the means for alternately coupling the second and third switching means to the first electrode of the piezoelectric crystal comprises a second control signal coupled to the second switching means and a third control signal coupled to the third switching means, the second and third control signals having a 180° phase difference.

3. The capacitive charge pump circuit of claim 1, wherein the second potential is of a negative polarity relative to a reference potential coupled to the ground reference terminal and the third potential is of a positive polarity relative to the reference potential.

4. A capacitive charge pump circuit which provides to a piezoelectric crystal a voltage having a peak-to-peak magnitude which is at least substantially three times a first potential provided by a power supply terminal, comprising:

a first switch having a first terminal coupled to the power supply terminal, a second terminal, and a control terminal for receiving a first control signal;

a single capacitor having a first electrode coupled to the second terminal of the first switch, and a second electrode;

a second switch having a first terminal coupled to a ground reference terminal, a second terminal coupled to the second electrode of the capacitor, and a control terminal for receiving the first control signal;

a third switch having a first terminal coupled to the first electrode of the capacitor, a second terminal coupled to the ground reference terminal, and a control terminal for receiving a second control signal;

a fourth switch having a first terminal coupled to the second electrode of the capacitor, a second terminal, and a control terminal for receiving the second control signal;

a fifth switch having a first terminal coupled to the first electrode of the capacitor, a second terminal, and a control terminal for receiving a third control signal;

a sixth switch having a first terminal coupled to the second electrode of the capacitor, a second terminal coupled to the power supply terminal, and a control terminal for receiving the third control signal;

the piezoelectric crystal having a first electrode and a second electrode, the first electrode being alternately coupled to the second terminal of the fourth switch and the second terminal of the fifth switch by operation of the second and third control signals so that a second and a third potential alternately appear at the first electrode of the piezoelectric crystal; and means, coupled to the second electrode of the piezoelectric crystal, for selecting between the first potential and a reference potential coupled to the ground reference terminal.

5. The capacitive charge pump circuit of claim 4, wherein the second and third control signals have a 180° phase difference.

6. The capacitive charge pump circuit of claim 4, wherein the means for selecting between the first potential and the reference potential comprises:

a first mode select switch having a first terminal coupled to the power supply terminal for receiving the first potential, a second terminal coupled to the second electrode of the piezoelectric crystal, and a control terminal;

a second mode select switch having a first terminal coupled to the second electrode of the piezoelectric crystal, a second terminal, and a control terminal;

a seventh switch having a first terminal coupled to the second terminal of the second mode select switch, a second terminal coupled to the power supply terminal, and a control terminal for receiving a fourth control signal; and an eighth switch having a first terminal coupled to the second terminal of the second mode select switch, a second terminal coupled to the ground reference terminal, and a control terminal for receiving the fourth control signal.

7. The capacitive charge pump circuit of claim 4, wherein the second potential is of a negative polarity relative to the reference potential and the third potential is of a positive polarity relative to the reference potential.

8. A capacitive charge pump circuit which provides to a piezoelectric crystal a voltage having a peak-to-peak magnitude which is at least substantially five times a first potential provided by a power supply terminal, comprising:

a first switch having a first terminal coupled to the power supply terminal, a second terminal, and a control terminal for receiving a first control signal;

a first capacitor having a first electrode coupled to the second terminal of the first switch, and a second electrode;

a second switch having a first terminal coupled to a ground reference terminal, a second terminal coupled to the second electrode of the first capacitor, and a control terminal for receiving the first control signal;

a third switch having a first terminal coupled to the power supply terminal, a second terminal, and a control terminal for receiving the first control signal;

a second capacitor having a first electrode coupled to the second terminal of the third switch, and a second electrode;

a fourth switch having a first terminal coupled to the ground reference terminal, a second terminal coupled to the second electrode of the second capacitor, and a control terminal for receiving the first control signal;

a fifth switch having a first terminal coupled to the second electrode of the first capacitor, a second terminal coupled to the first electrode of the second capacitor, and a control terminal for receiving the first control signal;

a sixth switch having a first terminal coupled to the first electrode of the first capacitor, a second terminal, and a control terminal for receiving a second control signal;

a seventh switch having a first terminal coupled to the second electrode of the second capacitor, a second terminal coupled to the power supply terminal, and a control terminal for receiving the second control signal;

an eighth switch having a first terminal coupled to the first electrode of the first capacitor, a second terminal coupled to the ground reference terminal, and a control terminal for receiving a third control signal;

a ninth switch having a first terminal coupled to the second electrode of the second capacitor, a second terminal, and a control terminal for receiving the third control signal;

the piezoelectric crystal having a first electrode and a second electrode, the first electrode being alternately coupled to the second terminal of the sixth switch and the second terminal of the ninth switch by operation of the second and third control signals so that a second and a third potential alternately appear at the first electrode of the piezoelectric crystal; and means, coupled to the second electrode of the piezoelectric crystal, for selecting between the first potential and a reference potential coupled to the ground reference terminal.

9. The capacitive charge pump circuit of claim 8, wherein the second and third control signals have a 180° phase difference.

10. The capacitive charge pump circuit of claim 8, wherein the means for selecting between the first potential and the reference potential comprises:

a first mode select switch having a first terminal coupled to the power supply terminal for receiving the first potential, a second terminal coupled to the second electrode of the piezoelectric crystal, and a control terminal;

a second mode select switch having a first terminal coupled to the second electrode of the piezoelectric crystal, a second terminal, and a control terminal;

a tenth switch having a first terminal coupled to the second terminal of the second mode select switch, a second terminal coupled to the power supply terminal, and a control terminal for receiving a fourth control signal; and an eleventh switch having a first terminal coupled to the second terminal of the second mode select switch, a second terminal coupled to the ground reference terminal, and a control terminal for receiving the fourth control signal.

11. The capacitive charge pump circuit of claim 8, wherein the second potential is of a negative polarity relative to the reference potential and the third potential is of a positive polarity relative to the reference potential.

* * * * *